R. WIESENFELD.
FISH TONGS.
APPLICATION FILED AUG. 26, 1913.
1,095,054.
Patented Apr. 28, 1914.
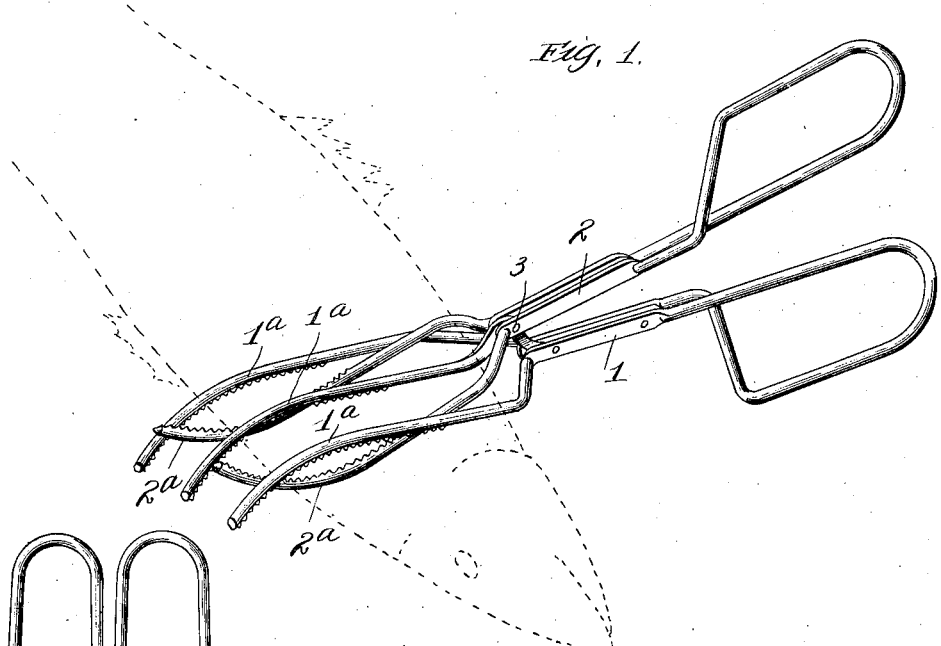
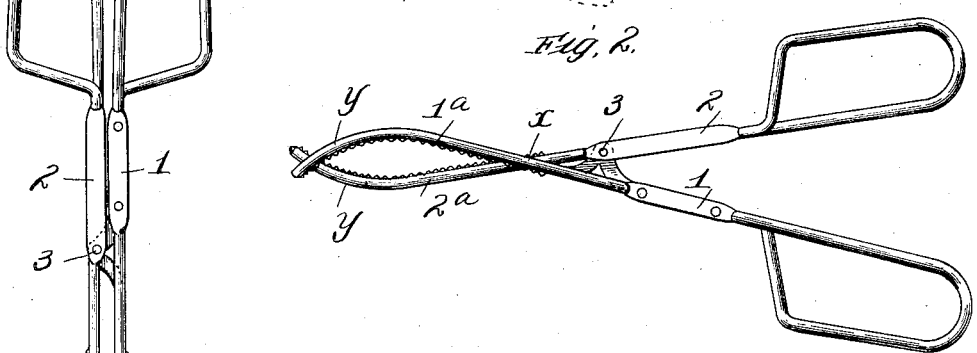
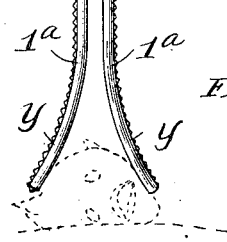
Witnesses
Inventor
Robert Wiesenfeld,
By Knight Bros
Attorneys.

UNITED STATES PATENT OFFICE.

ROBERT WIESENFELD, OF BALTIMORE, MARYLAND.

FISH-TONGS.

1,095,054.    Specification of Letters Patent.    Patented Apr. 28, 1914.

Application filed August 26, 1913. Serial No. 786,748.

*To all whom it may concern:*

Be it known that I, ROBERT WIESENFELD, a citizen of the United States, residing at Baltimore, in the State of Maryland, have invented certain new and useful Improvements in Fish-Tongs, of which the following is a specification.

This invention relates to an instrument operating upon the principle of a pair of tongs designed for use in gripping and holding a fish when it is desired to handle the same.

The object of the invention is to provide an instrument of this kind which will be convenient to use, and effective for the purposes for which it is intended.

To these ends, the invention consists in a pair of tongs connected together by a suitable fulcrum and formed at one end with hand holds for prehension, and at the other end carrying a plurality of fingers extending for a part of their length in the plane of the tong members and oppositely curved and preferably serrated for gripping; the fulcrum being suitably offset from one tong in order to bring the two members on opposite sides, so that the tongs are brought into improved gripping relation when open, and when completely closed, the two tongs will lie on opposite sides of an intermediate longitudinal plane and the oppositely curved ends of the gripping fingers will diverge and leave between them a tapering space that may be used to confine and hold down a fish lying on a surface.

The invention will be fully understood upon reference to the accompanying drawing, in which—

Figure 1 is a perspective view illustrating the multiple finger ends in gripping relation; Fig. 2 is a side view of the same, and Fig. 3 is a side view showing the tongs completely closed.

1 and 2 represent the tong members which are connected by a fulcrum 3 supported from the member 1, but sufficiently offset therefrom to bring the two members on opposite sides of an intermediate longitudinal plane as shown in Fig. 3, when the tongs are completely closed, and also to cause the tongs to intersect at a point such as X well beyond the fulcrum when in the act of gripping a fish between the tongs and thereby improving the gripping effect by delaying the parallelism of the tongs as they close together. The outer ends of the tongs are curved as at $y$, which is usual, but the relation of the fulcrum to the tongs combined with the feature of curving the outer ends, produces a novel and advantageous effect, in that it conserves the oval shape of the gripping space, thereby improving the gripping effect without injury to the fish. A further important advantage arising from the location of the fulcrum and the opposite curving of the ends of the tongs, is the provision of a gripping space between the diverging ends when the tongs are completely closed, as suggested in Fig. 3, so that the instrument can be used for holding down a fish upon a surface while the hook is removed, when it may be found more convenient to control the fish in this way.

As shown in Fig. 1, the gripping ends of the tongs are preferably made up of a plurality of fingers $1^a$, $2^a$, as is usual in gripping tongs, but which is particularly advantageous in connection with the curvature and the particular location of the fulcrum, in that it allows the intermeshing of the ends of the tongs while providing the necessary lateral dimension of the gripping ends to hold the fish normal to the direction of gripping pressure.

I claim:—

1. Fish tongs comprising a pair of members constructed at one end for prehension, and each provided at its opposite end with a plurality of gripping fingers, the fingers on one member being alternated in position with and adapted to enter between fingers on the other member; said fingers being extended in the line of the members for a portion of their length and terminating in curved ends; and said members having a connecting fulcrum carried by one member and offset therefrom to cause the gripping ends to intersect at a point beyond the fulcrum.

2. Fish tongs comprising a pair of members constructed at one end for prehension, and each provided at its opposite end with a plurality of gripping fingers; the fingers on one member being alternated in position with and adapted to enter between fingers on the other member; said fingers being extended in the line of the members for a portion of their length and terminating in curved ends; said members having a connecting fulcrum carried by one member and offset therefrom toward the other member, to cause said fingers to intersect at a point beyond the fulcrum, when the tongs are opened and to lie on opposite sides of and diverge from an intermediate plane, when said tongs are fully closed.

The foregoing specification signed at Baltimore, Maryland, this 19th day of August, 1913.

ROBERT WIESENFELD.

In presence of two witnesses:
 ISRAEL B. BRODIE,
 JOHN HENRY SKEEN.